(12) United States Patent
Balasubramanian et al.

(10) Patent No.: US 9,100,294 B2
(45) Date of Patent: Aug. 4, 2015

(54) NETWORK CONFIGURABLE INDUSTRIAL DEVICE

(71) Applicant: Rockwell Automation Technologies, Inc., Mayfield Heights, OH (US)

(72) Inventors: Sivaram Balasubramanian, Solon, OH (US); Gary D. Dotson, Muskego, WI (US); Benjamin Nave, Beachwood, OH (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 207 days.

(21) Appl. No.: 13/754,848

(22) Filed: Jan. 30, 2013

(65) Prior Publication Data
US 2014/0211657 A1   Jul. 31, 2014

(51) Int. Cl.
*H04L 12/46* (2006.01)
*H04L 12/24* (2006.01)
*H04L 12/933* (2013.01)

(52) U.S. Cl.
CPC ............ *H04L 41/0803* (2013.01); *H04L 49/15* (2013.01); *H04L 12/4625* (2013.01)

(58) Field of Classification Search
None
See application file for complete search history.

(56) References Cited

U.S. PATENT DOCUMENTS

| | | | |
|---|---|---|---|
| 6,233,242 B1 * | 5/2001 | Mayer et al. | 370/412 |
| 7,613,116 B1 * | 11/2009 | Medina | 370/235 |
| 8,244,838 B2 | 8/2012 | Balasubramanian et al. | |
| 2004/0008722 A1 * | 1/2004 | Ellis et al. | 370/461 |
| 2004/0240446 A1 * | 12/2004 | Compton | 370/389 |
| 2007/0169149 A1 * | 7/2007 | Jennings et al. | 725/58 |
| 2011/0029687 A1 * | 2/2011 | Kirrmann et al. | 709/236 |

* cited by examiner

*Primary Examiner* — Michael J Moore, Jr.
*Assistant Examiner* — Ayanah George
(74) *Attorney, Agent, or Firm* — Amin, Turocy & Watson, LLP

(57) ABSTRACT

A device is configured to be operable in a plurality of network environments. A number of different configurations are available to be set on the device, where a first configuration enables operation on a first network, and a second configuration enables operation on a second, disparate, network. A plurality of external ports in conjunction with a multiplexer switch, network switch, internal CPU, external CPU, routing links, etc., can be combined to facilitate multiple configurations for the device. The device is suitable for incorporation into a human machine interface, for application in an industrial processing operation. Receive port information can be incorporated into a data frame to facilitate identification of an external port associated with the reception of the data frame. Applicable networks include linear topology, ring topology, star topology, Ethernet, ROCKWELL NEO, EtherNet/IP, one or more LANs, etc. Configuration can be via a USB device or an interface.

16 Claims, 11 Drawing Sheets

(Mode 1)

(Mode 2)

(Mode 3)

(Mode 4)

(Mode 5A)

(Mode 5B)

(Mode 6A)

(Mode 6B)

(Mode 7)

(Mode 8)

(Mode 9)

(Mode 10)

NETWORK CONFIGURABLE INDUSTRIAL DEVICE

TECHNICAL FIELD

The subject specification relates generally to control systems employed in an industrial automation environment and in particular to configuration of a device for application in a network environment.

BACKGROUND

Computer systems, as with other operating environments, have found numerous applications in the industrial automation environment and are employed ubiquitously throughout, e.g., to control the operation of a process, machine, device, and the like. To facilitate control of a process, etc., one or more controllers (e.g., a programmable logic controller (PLC)) are utilized with input/output (I/O) devices controlling operation of the process along with gathering process information (e.g., measurements, data, values, parameters, variables, metadata, etc.) pertaining to how the process is performing. To maximize interaction of an operator with the process, the process information can be forwarded from the controller to one or more interfaces, also known as human machine interfaces (HMI's), graphical user interfaces (GUI's), terminals, and the like, for display to the operator. Upon review of the displayed process information, and in conjunction with hard and soft controls associated with the interface, the operator can further adjust the process as required to facilitate correct process operation. Commands can be generated at the interface, forwarded to the controller, and accordingly acted upon by the controller. For example, the temperature of a furnace can be detected by a thermocouple, signals are sourced from the thermocouple by the controller, forwarded by the controller for display on the interface, whereupon an operator notices a drop in the furnace temperature, presses an 'increase temperature' control, and a furnace heater is switched on in response, via the controller.

Many applications require devices (e.g., HMI's) to be connected to a network using a linear topology where devices typically include two Ethernet ports (dual ports) and are connected in sequence, one device to the next, per the configuration of an Ethernet network. However, a potential problem with this approach is that a failure of one node, or a link between two nodes, causes nodes on either side of the failure to be unreachable. In effect, the network is broken. An approach to address such a problem is a device level ring (DLR) network. DLR utilizes an Ethernet based ring protocol to facilitate connection of the networked devices, where the devices can be configured in a ring topology such that even in the event of a single-point failure (e.g., failure of a link between two nodes) communication can still occur between the remaining devices comprising the network.

Further, for a device to operate in a given network (e.g., a linear topology network) requires different network hardware/configuration to facilitate such operation compared with a device configured to operate in a different type of network (e.g., a ring topology network). Hence, for example, while the requirements of a HMI may be the same for a process operating with a DLR network as that of an HMI working in a star network (e.g., display of process parameters, data acquisition, etc.) two separate devices have to be stored in inventory and made available to a customer, e.g., a first HMI configured for DLR topology operation and a second HMI configured for star topology operation. Offering two distinct devices to perform similar functionality adds undesired complexity to a company's product offerings in terms of catalog numbers, manufacturing, inventory, and the like.

Further, other forms of network protocol may be encountered in an industrial plant. For example, Ethernet, DLR (which is a flavor of Ethernet protocol), and other network protocols may exist such as, for industrial applications, Ethernet Industrial Protocol (EtherNet/IP or ENIP) has been developed, where EtherNet/IP is an industrial application layer protocol used for communication between industrial control systems and their components, such as a programmable automation controller, programmable logic controller or an I/O system.

Another protocol is NEO, developed by ROCKWELL AUTOMATION, for communication at the chassis/backplane level of a control system. NEO was developed to extend functionality compared with standard Ethernet protocol. In effect, NEO can be considered to be Ethernet operating at the backplane physical layer, e.g., at a board layer rather than at a cable layer.

The above-described deficiencies of conventional networked devices are merely intended to provide a contextual overview of some of the problems of conventional systems and techniques, and are not intended to be exhaustive. Other problems with conventional systems and techniques, and corresponding aspects of the various non-limiting embodiments described herein may become further apparent upon review of the following description.

BRIEF DESCRIPTION OF THE DRAWINGS

Various non-limiting embodiments are further described with reference to the accompanying drawings in which.

DETAILED DESCRIPTION

As previously described, a device can operate in a single network environment, e.g., an Ethernet network, a DLR network, an EtherNet/IP network, a NEO backplane, a linear topology network, a star topology network, a ring topology network, etc. However, with conventional systems, separate hardware/software is required for a device to operate in a specific network, e.g., in a DLR network compared with an Ethernet network. A DLR network configured device will not operate in an Ethernet configured network. Hence, offering a plurality of distinct devices to perform similar functionality adds complexity to a company's product offerings in terms of catalog numbers, manufacturing, inventory, and the like. In the various exemplary, non-limiting embodiments presented herein, a single device can be configured to operate in a plurality of network types, with the hardware/software effectively being common to all of the supported network types. For example, firmware can be incorporated into a HMI device with the firmware comprising data/code to facilitate operation of the HMI in any network, (e.g., Ethernet, DLR, EtherNet/IP, NEO, etc.), while during setup of the HMI a particular network configuration can be selected from any of the supported configurations (e.g., any of the configurations available on/supported by the firmware).

For the sake of readability a device, a HMI, a controller, a communication bridge, a communication adapter, an Input/Output device on network, an interface, terminal, GUI, and the like, are referred to as a device or an HMI, however, it is to be appreciated that the terms 'device' or 'HMI' relate to any interface, terminal, device, HMI, GUI, machine, component, software, etc., requiring network communication.

Further, the term address is used throughout to convey the concept of identification of any of a port, internal CPU, external CPU, and the like, where the address can comprise of any configuration/format as required to facilitate transmission of data across a respective network. An address can be an Internet Protocol (IP) address, a Media Access Control (MAC) address, etc.

Furthermore, the term 'host' is used herein to refer to a CPU, e.g., an internal CPU or an external CPU where a particular function is implemented/hosted. For example, a DLR function may be handled by internal CPU while an IP function may be handled by external CPU.

Further, various embodiments presented herein relate to the concept of identifiers, etc., being incorporated into a data frame. It is to be appreciated that the identifiers can be incorporated into any suitable position of a data frame/date frame header, such as at the beginning of a frame, at the end, in the middle, etc.

Figure 3:
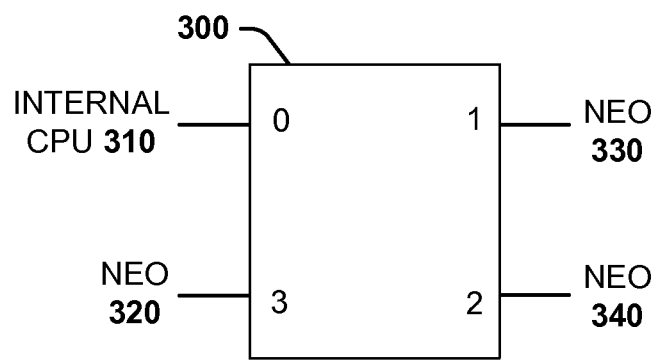
FIG. 3 is a block diagram illustrating exemplary, non-limiting embodiments for configuration of a network switch according to a third mode of operation.

FIG. 3 illustrates switching system 300, an exemplary, non-limiting embodiment referred to herein as switch mode 3. Switch mode 3 can support a system comprising a NEO backplane expansion function. For example, in comparison with FIG. 1, port 3 is connected to NEO 320, and thus, in switch mode 3, port 1 (e.g., NEO 330), port 2 (e.g., NEO 340), and port 3 (e.g., NEO 320) can function as full-fledged external ports comprising a three port system where each port can have identical capabilities. In switch mode 3, ports 1 and 2 can support NEO DLR functionality.

Figure 4:
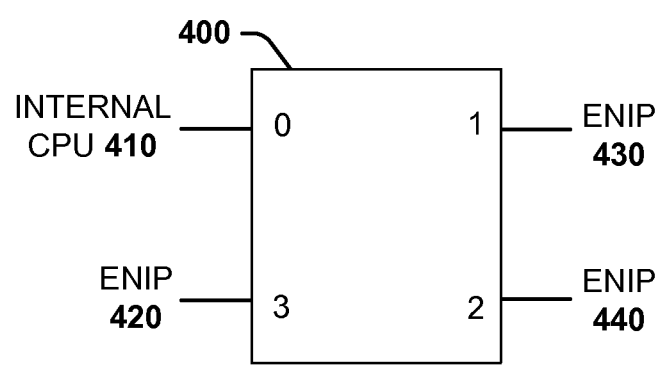
FIG. 4 is a block diagram illustrating exemplary, non-limiting embodiments for configuration of a network switch according to a fourth mode of operation.
Figure 5:
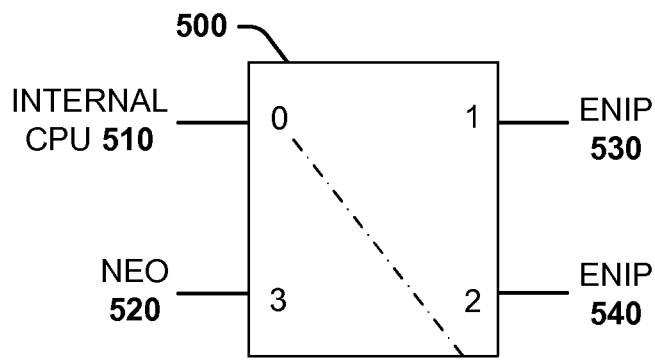
FIG. 5 is a block diagram illustrating exemplary, non-limiting embodiments for configuration of a network switch according to a fifth, first-type, mode of operation.
Figure 6:
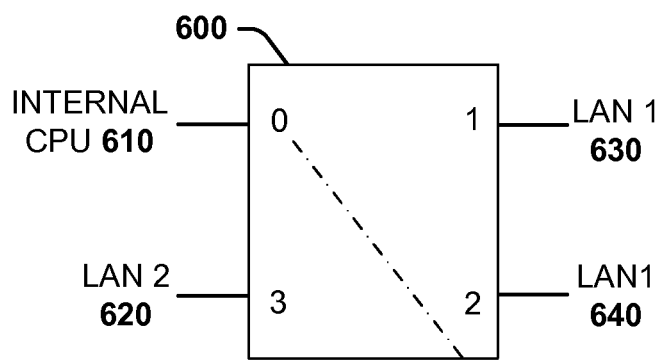
FIG. 6 is a block diagram illustrating exemplary, non-limiting embodiments for configuration of a network switch according to a fifth, second-type, mode of operation.
Figure 7:
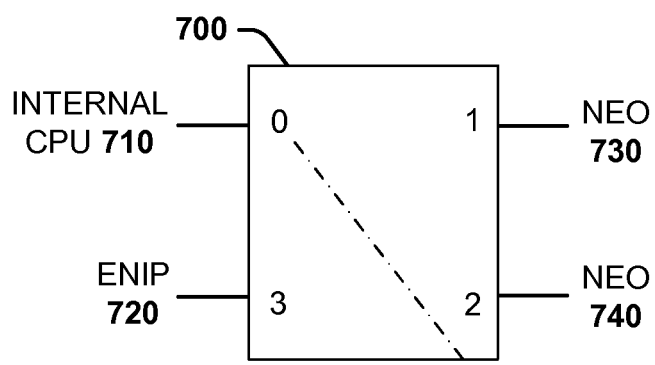
FIG. 7 is a block diagram illustrating exemplary, non-limiting embodiments for configuration of a network switch according to a sixth, first-type, mode of operation.
Figure 8:
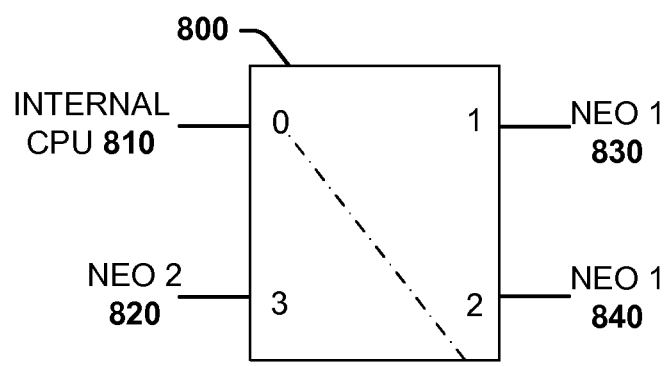
FIG. 8 is a block diagram illustrating exemplary, non-limiting embodiments for configuration of a network switch according to a sixth, second-type, mode of operation.

As shown in FIGS. 1-12 and Table 1, 10 modes of operation of a switching operation can be supported (FIGS. 5 and 6 have a common configuration, and FIGS. 7 and 8 have a common configuration). The common representation utilized in FIGS. 1-12 is device side components are typically depicted on the left hand side of a switch (e.g., with reference to FIG. 1, Internal CPU 110 and External CPU 120), while network components are typically depicted on the right hand side of a switch (e.g., with reference to FIG. 1, NEO configuration 130 and NEO configuration 140). In an exemplary embodiment, an Internal CPU (e.g., any of 110, 210, 310, 410, 510, 610, 710, 810, 910, 1010, 1110, and 1210) can be on same application-specific integrated circuit (ASIC) containing the switch, for example, while the External CPU can be located on a separate circuit. With the various exemplary embodiments presented below, a particular frametype(s) can be directed for handling by the Internal CPU while another frametype(s) can be directed for handling by the External CPU, as explained further below.

A switch (e.g., as depicted in FIGS. 1-12) can support up to four addresses (e.g., any of an IP address, a MAC address, and the like). In the first four switch modes (FIGS. 1-4) any of one, two, three, or four addresses can be used interchangeably as the network in each switch mode is common (e.g., the network can be NEO or EtherNet/IP (ENIP)).

In the switch modes 5A-9 (FIGS. 5-11), two networks are supported with addresses 1 and 3 being dedicated to one network, with either one, or both, addresses being used interchangeably. Further, addresses 2 and 4 are dedicated to a second network where either one, or both, addresses can be used interchangeably. With switch modes 5A-9, one or both of the addresses for a first network must be different to one or both of the addresses for the second network as forwarding rules utilize the addresses to facilitate unique forwarding of traffic from a CPU (e.g., any of CPU's 510, 610, 710, 810, 910, 1010 and 1110, and/or CPUs 920, 1020, and 1120) to the required network. For example, in switch modes 5 and 6 (e.g., FIGS. 5-8) a network address is dedicated to a network on ports 1 and 2, while a second network address is dedicated to a network on port 3. In switch modes 7, 8, and 9 (e.g., FIGS. 9-11) a network address is dedicated to a network on port 1, and a second network address is dedicated to a network on port 2. In switch modes 1, 2, 7, 8, and 9, a given address can correspond to both an internal CPU (e.g., CPU's 110, 210, 710, 810, and 910) on port 0, and an external CPU on port 3 (e.g., CPU's 120, 220, 720, 820, and 920). In switch modes 1, 2, 7, 8 and 9, routing to a correct CPU can be based on a configuration of a frame routing option for a host port.

Figure 12:
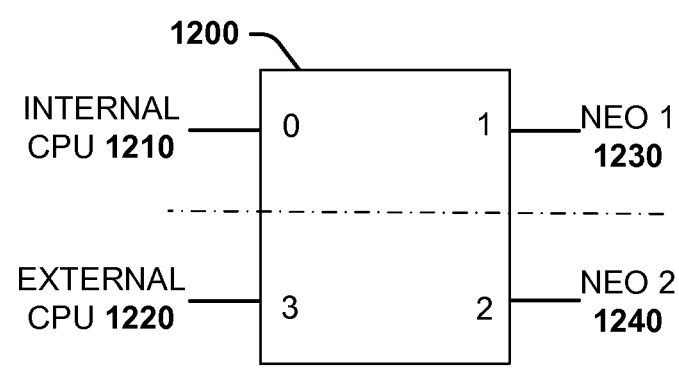
FIG. 12 is a block diagram illustrating exemplary, non-limiting embodiments for configuration of a network switch according to a tenth mode of operation.

Further, as shown in FIG. 12 (mode 10) a configuration can be of a first network (e.g., NEO 1 1230) connected directly to a first CPU (e.g., internal CPU 1210) while a second network (e.g., NEO 2 1240) can be connected directly to a second CPU (e.g., external CPU 1220). It is to be appreciated that while FIG. 12 depicts the first network and second network to be respective NEO configurations, the networks can be of any configuration, e.g., LAN, ENIP, NEO, where a network and CPU are uniquely combined.

The various switch modes depicted in FIGS. 1-11 are summarized in Table 1, below:

| Mode | FIG. | Port 1 | Port 2 | Port 3 | Port 0 | Host Ports | Source byte added to frames received by host ports | Rout'g Group 1 | Rout'g Group 2 |
|---|---|---|---|---|---|---|---|---|---|
| 1  | 1  | NEO   | NEO   | Ext CPU | Int CPU | 3 & 0 | No  | 1, 2 <-> 0, 3 | — |
| 2  | 2  | EIP   | EIP   | Ext CPU | Int CPU | 3 & 0 | No  | 1, 2 <-> 0, 3 | — |
| 3  | 3  | NEO   | NEO   | NEO     | Int CPU | 0     | No  | 1, 2, 3 <-> 0 | — |
| 4  | 4  | EIP   | EIP   | EIP     | Int CPU | 0     | No  | 1, 2, 3 <-> 0 | — |
| 5A | 5  | EIP   | EIP   | NEO     | Int CPU | 0     | Yes | 1, 2 <-> 0 | 3 <-> 0 |
| 5B | 6  | EIP1  | EIP1  | EIP2    | Int CPU | 0     | Yes | 1, 2 <-> 0 | 3 <-> 0 |
| 6A | 7  | NEO   | NEO   | EIP     | Int CPU | 0     | Yes | 1, 2 <-> 0 | 3 <-> 0 |
| 6B | 8  | NEO 1 | NEO 1 | NEO 2   | Int CPU | 0     | Yes | 1, 2 <-> 0 | 3 <-> 0 |
| 7  | 9  | EIP   | EIP   | Ext CPU | Int CPU | 3 & 0 | Yes | 1 <-> 3, 0 | 2 <-> 3, 0 |
| 8  | 10 | EIP   | NEO   | Ext CPU | Int CPU | 3 & 0 | Yes | 1 <-> 3, 0 | 2 <-> 3, 0 |
| 9  | 11 | NEO   | NEO   | Ext CPU | Int CPU | 3 & 0 | Yes | 1 <-> 3, 0 | 2 <-> 3, 0 |
| 10 | 12 | NEO   | NEO   | Ext CPU | Int CPU | 3 & 0 | No  | 1 <-> 0 | 2 <-> 3 |

Figure 9:
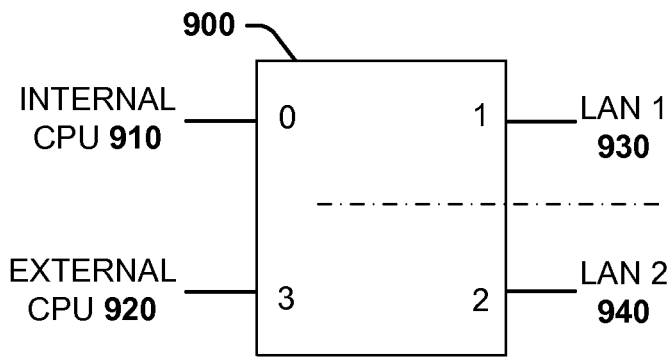
FIG. 9 is a block diagram illustrating exemplary, non-limiting embodiments for configuration of a network switch according to a seventh mode of operation.
Figure 10:
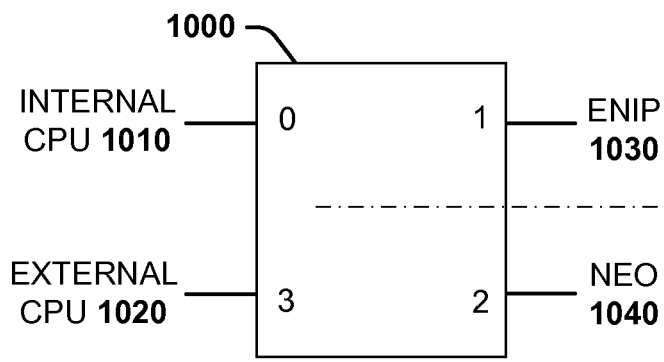
FIG. 10 is a block diagram illustrating exemplary, non-limiting embodiments for configuration of a network switch according to an eighth mode of operation.
Figure 11:
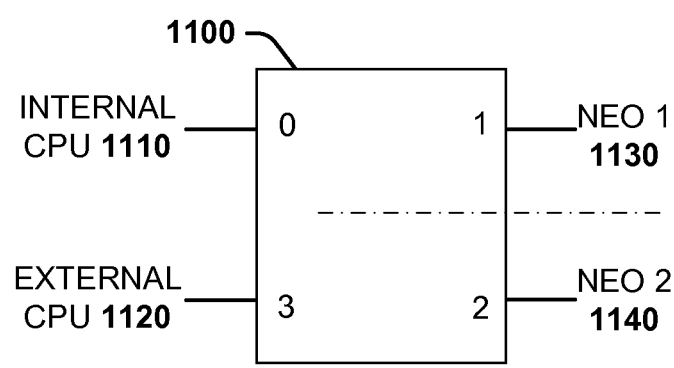
FIG. 11 is a block diagram illustrating exemplary, non-limiting embodiments for configuration of a network switch according to a ninth mode of operation.
Figure 13:
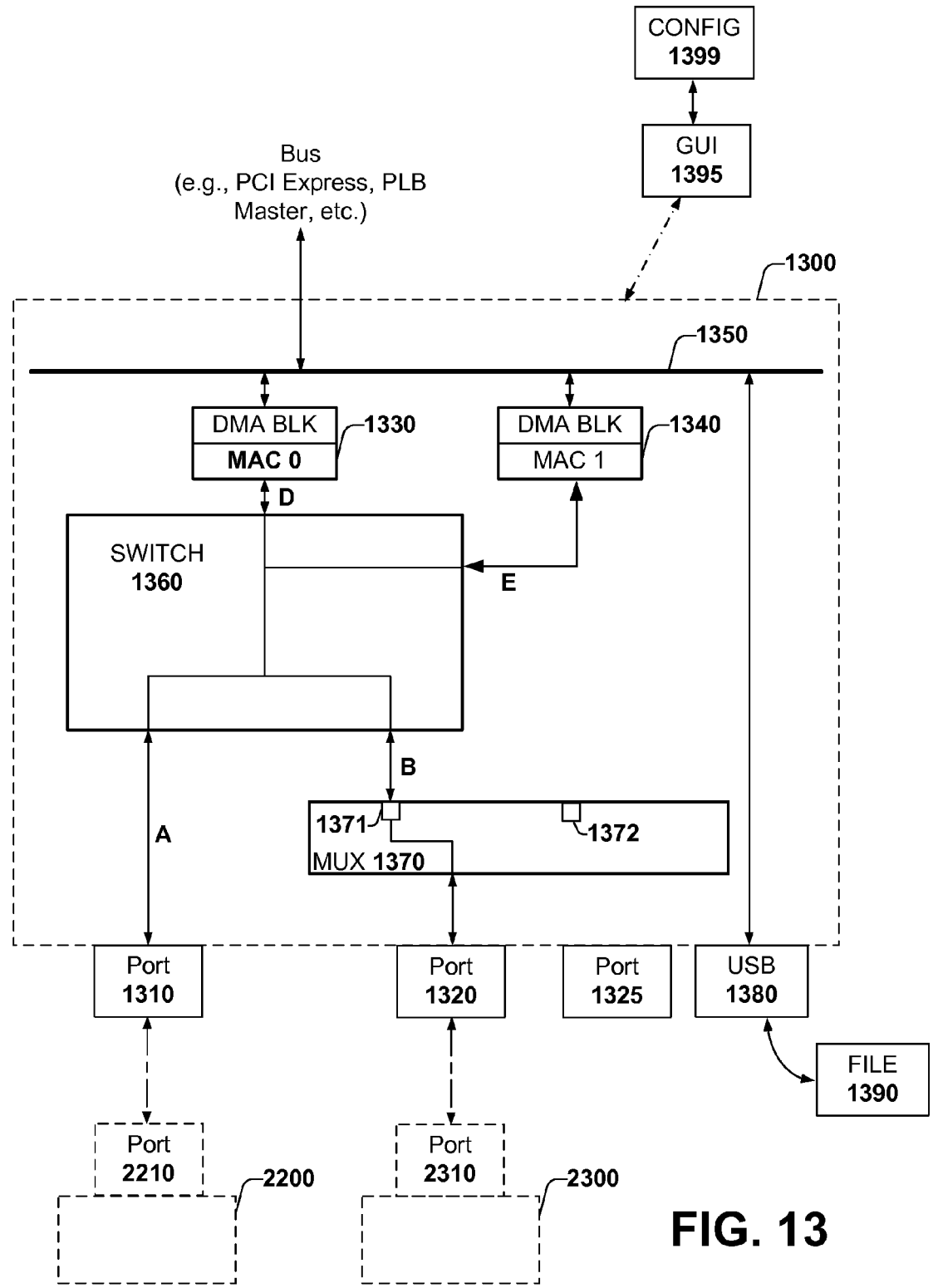
FIG. 13 is a block diagram illustrating exemplary, non-limiting embodiments for configuration of a device to operate in a plurality of network applications.
Figure 14:
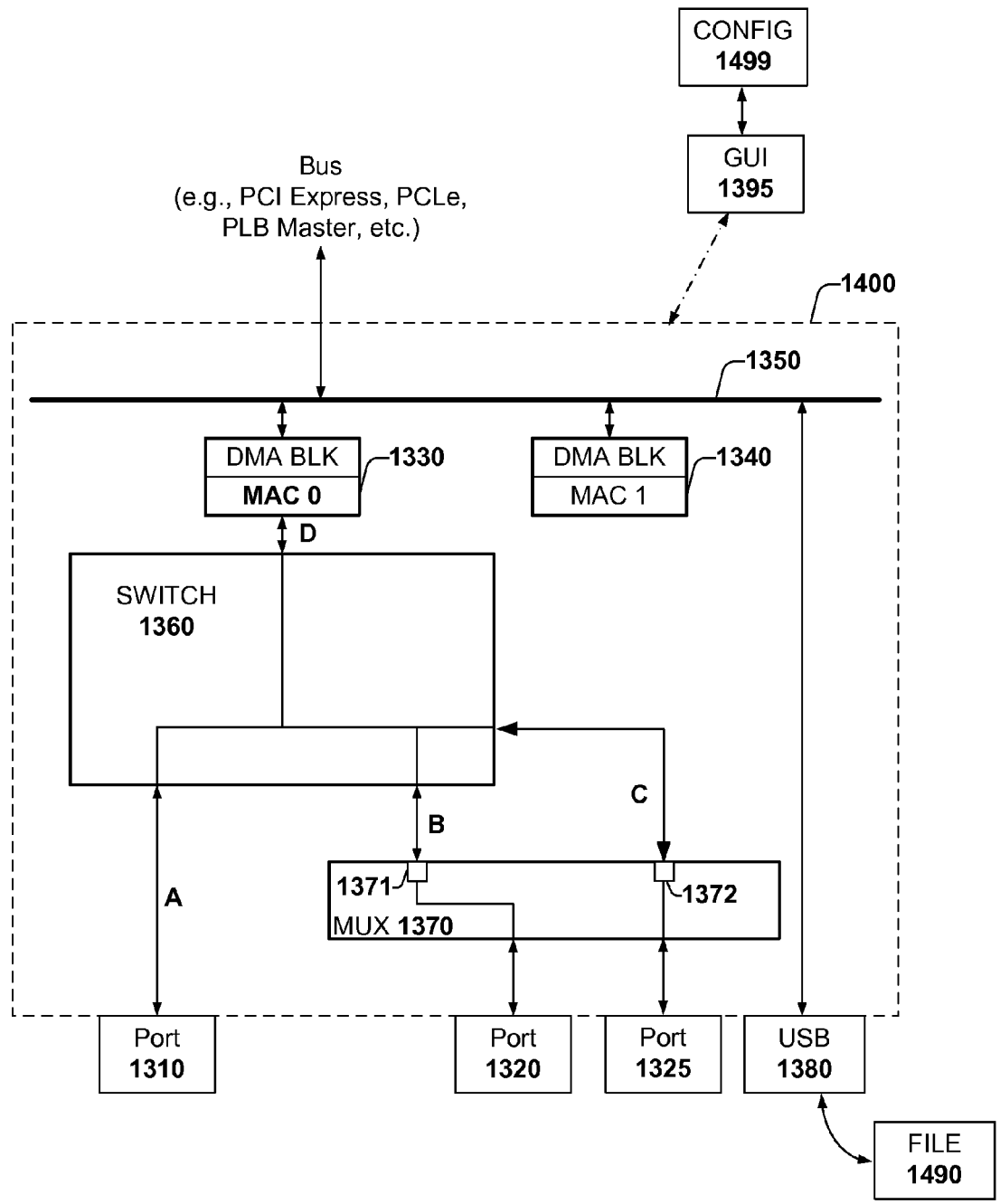
FIG. 14 is a block diagram illustrating exemplary, non-limiting embodiments for configuration of a device to operate in a plurality of network applications.
Figure 15:
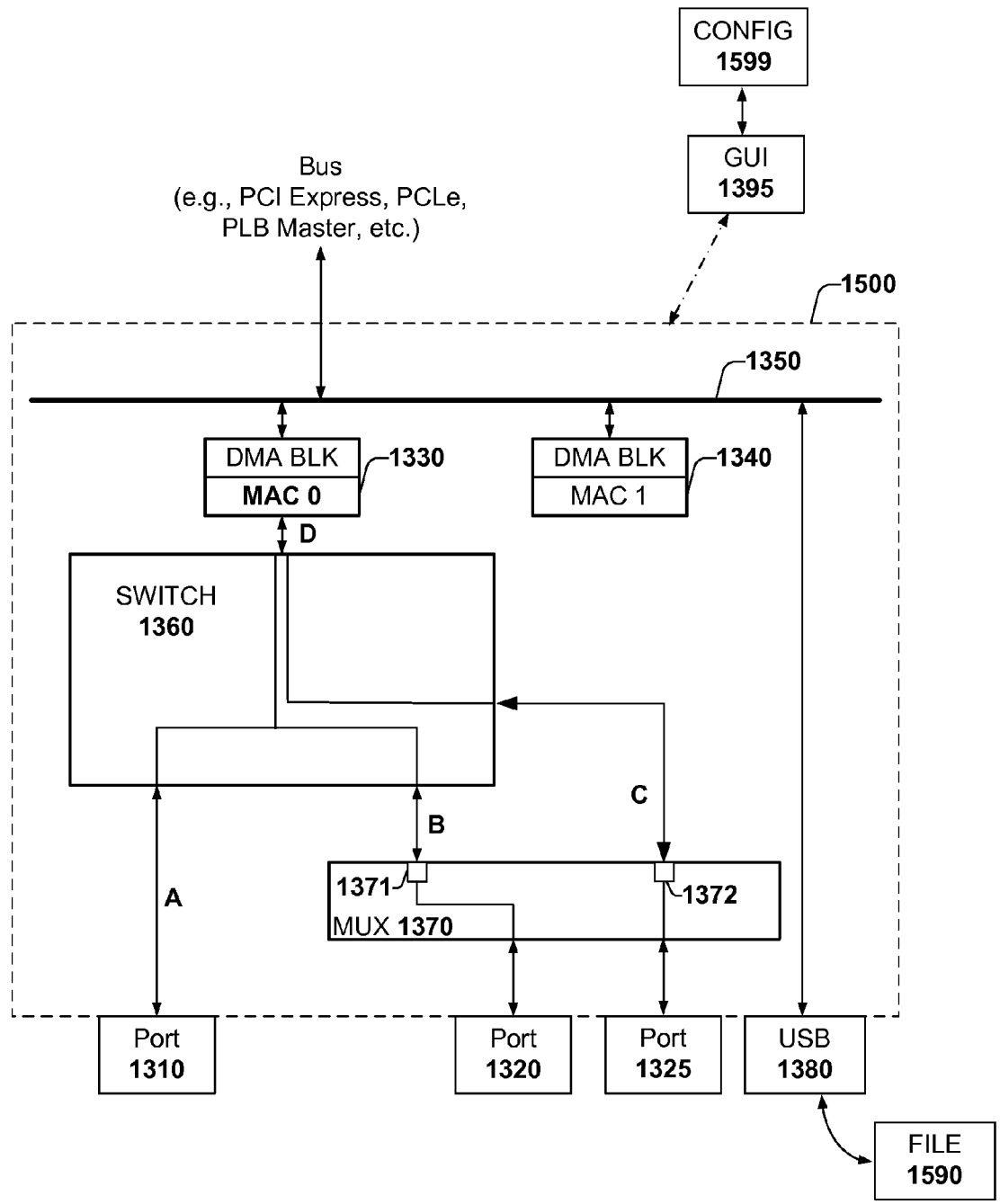
FIG. 15 is a block diagram illustrating exemplary, non-limiting embodiments for configuration of a device to operate in a plurality of network applications.
Figure 16:
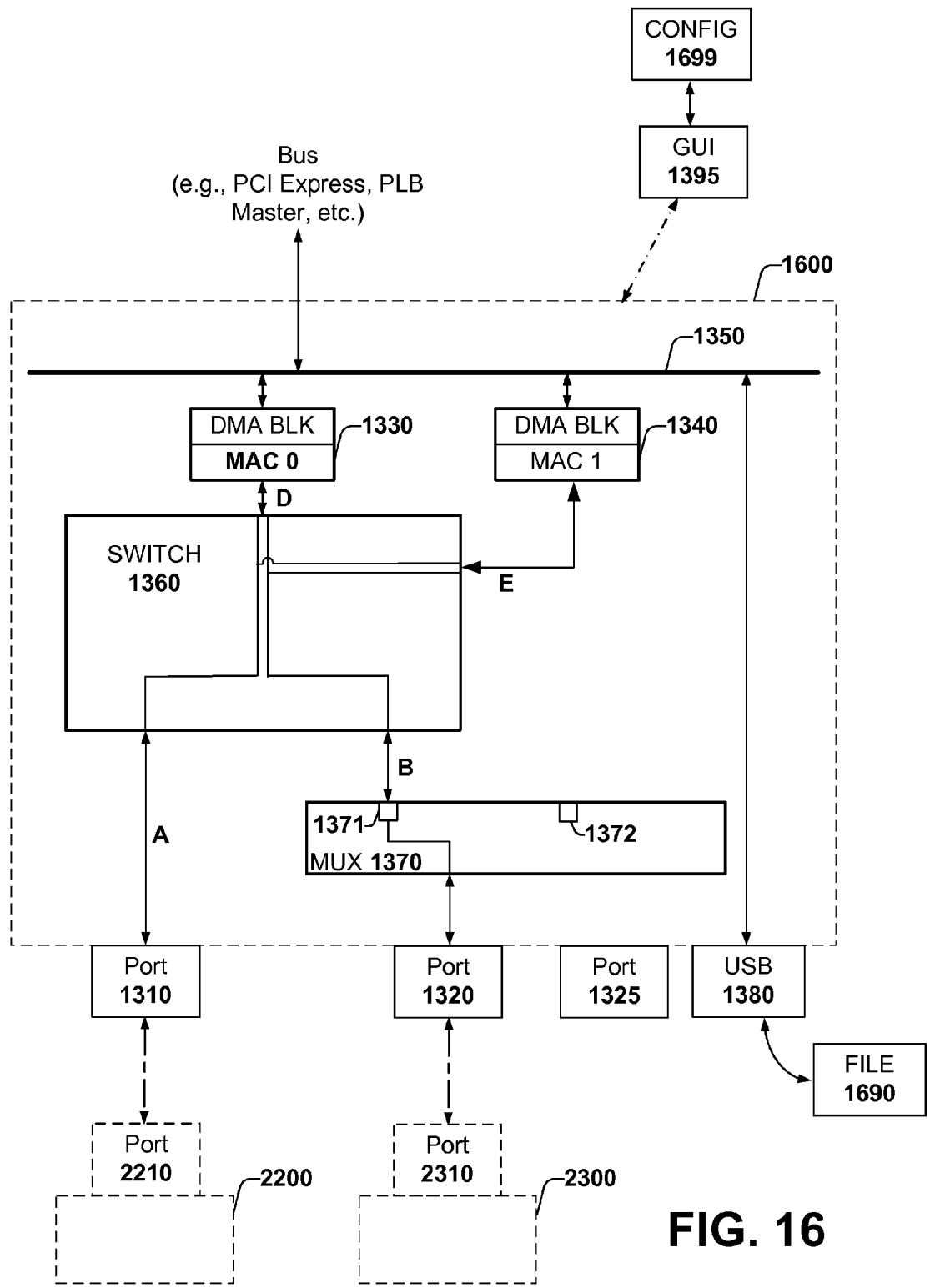
FIG. 16 is a block diagram illustrating exemplary, non-limiting embodiments for configuration of a device to operate in a plurality of network applications.
Figure 17:
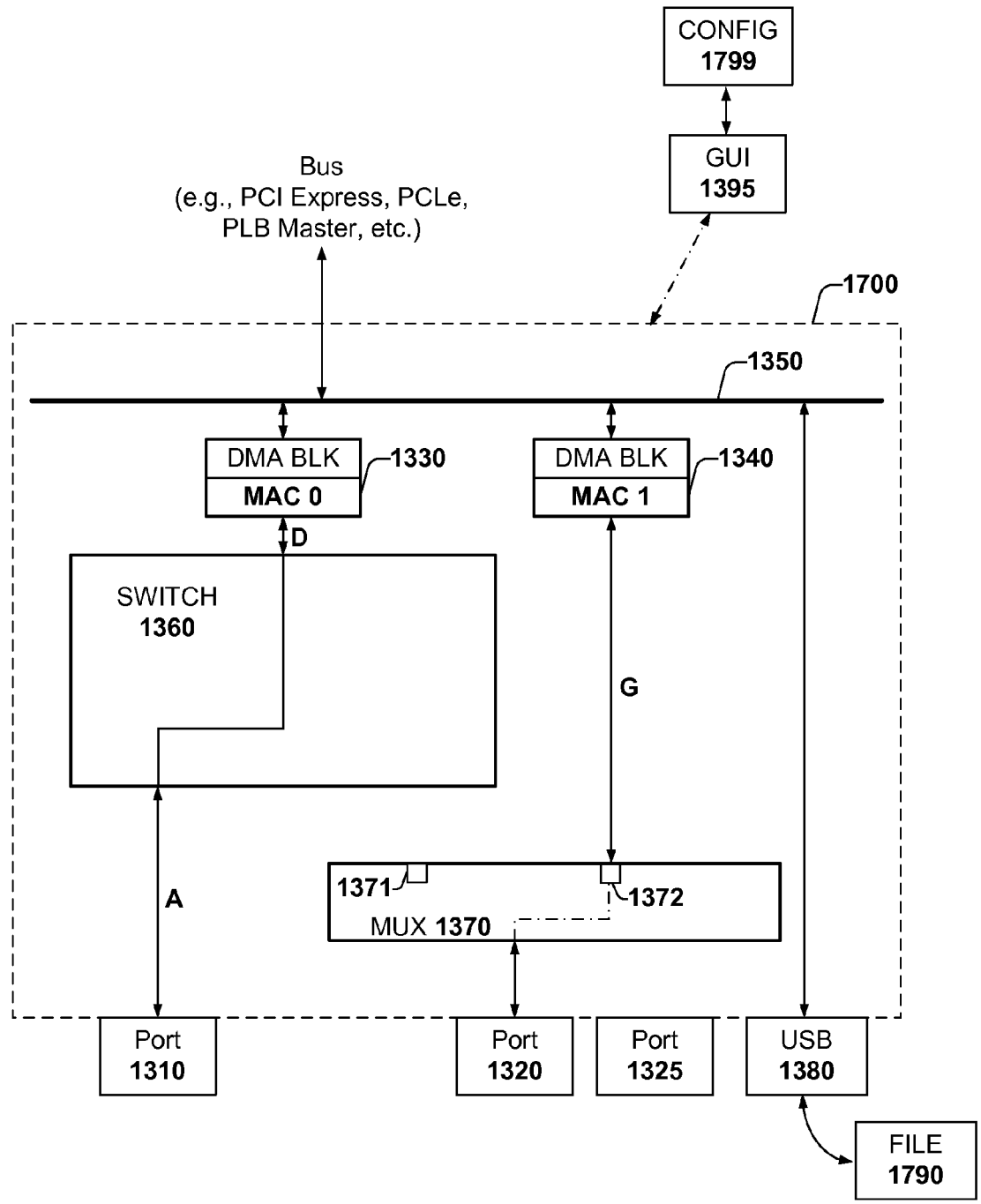
FIG. 17 is a block diagram illustrating exemplary, non-limiting embodiments for configuration of a device to operate in a plurality of network applications.

As previously mentioned, the different modes 1-10 (as illustrated in FIGS. 1-12) can be depicted by various system representations as shown in FIGS. 13-17. FIG. 13 depicts a dual port single network which can be utilized to support configurations depicted in modes 1 and 2 (e.g., FIGS. 1 and 2). FIG. 14 depicts a three port single network system which can be utilized to support the configuration depicted in modes 3 and 4. FIG. 15 depicts a three port dual network system which can be utilized to support modes 5 and 6 (e.g., FIGS. 5, 6, 7, and 8). FIG. 16 depicts a dual port dual network approach which can be utilized to support mode 7, 8 and 9 (FIGS. 9, 10 and 11). FIG. 17 depicts two networks with respective data communications directed to one of two addresses (e.g., MAC 0 and MAC 1).

Figure 1:
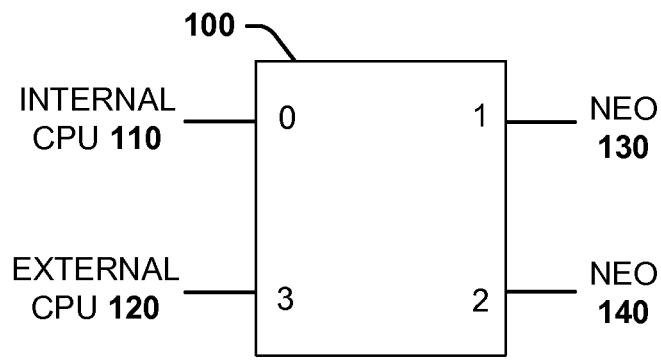
FIG. 1 is a block diagram illustrating exemplary, non-limiting embodiments for configuration of a network switch according to a first mode of operation.

FIG. 1, illustrates switching system 100, an exemplary, non-limiting embodiment referred to herein as switch mode 1. Switch mode 1 can support a NEO backplane (e.g., NEO 130 and NEO 140), for example for high and low performance modules, with optional connection of an external CPU 120 and internal CPU 110 respectively. In an exemplary operation, an external CPU can operate with a higher level of performance compared with an internal CPU, hence a high performance product/device can operate with an external CPU (e.g., CPU 120) while a low performance product/device can operate with an internal CPU (e.g., CPU 110). Data (e.g., a data frame) received from either of NEO 130 or NEO 140 connected at respective ports 1 and 2 can be selectively forwarded to an internal CPU 110 (at port 0) or an external CPU 120 (at port 3). The selective forwarding can be based on a configuration of at least one frame routing option associated with a host CPU 110 or 120. In switch mode 1, ports 1 and 2 can support NEO DLR functionality.

Figure 2:
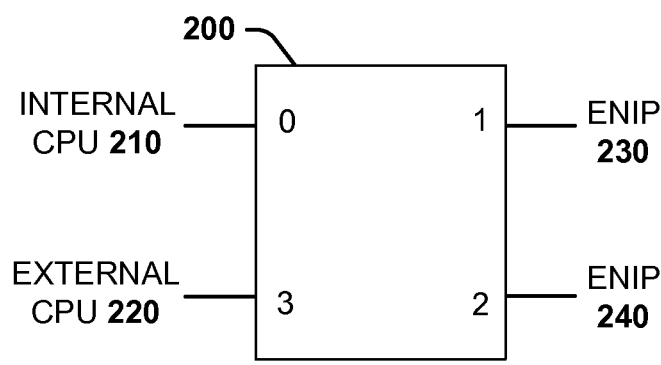
FIG. 2 is a block diagram illustrating exemplary, non-limiting embodiments for configuration of a network switch according to a second mode of operation.

FIG. 2, illustrates switching system 200, an exemplary, non-limiting embodiment referred to herein as switch mode 2. Switch mode 2 can support an EtherNet/IP interface (e.g., ENIP 230 and ENIP 240) to a suitable topology, e.g., comprising a linear network, a DLR network, or a Beacon Redundancy Protocol Network (BRP), for example. Switch mode 2 can be utilized with a high performance module with an external CPU 220 or low performance module with an internal CPU 210. A frame received from either of ENIP 230 or ENIP 240 connected at respective ports 1 and 2 can be selectively forwarded to an internal CPU 210 (at port 0) or an external CPU 220 (at port 3). The selective forwarding can be based on a configuration of at least one frame routing option associated with a host CPU 210 or 220.

FIG. 3 illustrates switching system 300, an exemplary, non-limiting embodiment referred to herein as switch mode 3. Switch mode 3 can support a system comprising a NEO backplane expansion function. For example, in comparison with FIG. 1, port 3 is connected to NEO 320, and thus, in switch mode 3, port 1 (e.g., Neo 330), port 2 (e.g., NEO 340), and port 3 (e.g., NEO 320) can function as full-fledged external ports comprising a three port system where each port can have identical capabilities. In switch mode 3, ports 1 and 2 can support NEO DLR functionality.

FIG. 4, illustrates switching system 400, an exemplary, non-limiting embodiment referred to herein as switch mode 4. Switch mode 4 can support a system comprising a network tap configuration, where in an exemplary embodiment, ENIP on 420 can be utilized to monitor (e.g., tap into) respective traffic flow between any of ENIP 430 on port 1, ENIP 440 on port 2, or internal CPU 410 on port 0. Further, for example, in comparison with FIG. 2, port 3 is connected to ENIP 420, and thus, in switch mode 4, port 1 (e.g., ENIP 430), port 2 (e.g., ENIP 440), and port 3 (e.g., ENIP 420) can function as full-fledged external ports comprising a three port system where each port can have identical capabilities. In switch mode 4, ports 1 and 2 can support DLR and BRP functionality.

FIG. 5, illustrates switching system 500, an exemplary, non-limiting embodiment referred to herein as switch mode 5A. With switch mode 5A, two networks can be supported, for example an ENIP based network on ports 1 and 2, and a NEO based backplane on port 3. Switch mode 5A can support a low performance communication adapter with internal CPU 510. As indicated by the broken line, frames received at ports 1 and/or 2 will not be forwarded to port 3 and remain in the domain of port 0, port 1 and port 2. Similarly frames received at port 3 will not be forwarded to port 1 and/or port 2, hence remain in the domain of port 0 and port 3. In switch mode 5A, ports 1 and 2 can support DLR and BRP functionality.

During operation, switch 500 can automatically add 'received port' information as a byte in a frame (e.g., a last frame byte), where the 'received port' information can identify the network from which the frame was received. In an exemplary, non-limiting embodiment, the 'received port' can be added after the last data byte in the frame. During transmission from port 0 to internal CPU 510, the switch 500 can add 'received port' information to received frame and regenerate a new frame cyclic redundancy check (CRC). A firmware MUX layer, can review the 'received port' byte and forward a frame to the appropriate higher level interface, e.g., typically two different Ethernet drivers can be utilized. During the transmission, the associated Ethernet drivers can use at least two different source MAC addresses for transmission of data on the respective ENIP network (e.g., ENIP 530 and ENIP 540) and the NEO network (e.g., NEO 520), wherein, switch 500 can forward the frame(s) to the appropriate network (e.g., ENIP or NEO) based on the source MAC address in the frame.

FIG. 6, illustrates switching system 600, an exemplary, non-limiting embodiment referred to herein as switch mode 5B. Switch mode 5B is similar in functionality to that illustrated in FIG. 5, switch mode 5A. However, rather than connecting ENIP's and a NEO, switch mode 5B can support two different ENIP networks on two different Local Area Networks (LANs), e.g., LAN1 630 and LAN1 640 on ports 1 and 2, with a second LAN, LAN2 620, on port 3. As indicated by the broken line, frames received at ports 1 and/or 2 will not be forwarded to port 3, and vice-versa, frames received at port 3 will not be forwarded to port 1 and/or port 2. As mentioned with regard to switch mode 5A, switch 600 in conjunction with a firmware MUX layer and two Ethernet drivers can effect correct routing of frames from/to the respective LANs. In switch mode 5B, ports 1 and 2 can support DLR and BRP functionality.

FIG. 7, illustrates switching system 700, an exemplary, non-limiting embodiment referred to herein as switch mode 6A. Switch mode 6A can support a low performance communication bridge with internal CPU 710. As indicated by the broken line, frames received at ports 1 and/or 2 will not be forwarded to port 3, and vice-versa, frames received at port 3 will not be forwarded to port 1 and/or port 2. As mentioned with regard to switch mode 5A, switch 700 in conjunction with a firmware MUX layer and two Ethernet drivers can effect correct routing of frames from/to the respective networks. A firmware MUX layer, can review the 'received port' byte and forward a frame to the appropriate higher level interface, e.g., typically two different Ethernet drivers can be utilized. During the transmission, associated Ethernet drivers can use at least two different source addresses for transmission of data on the respective NEO network (e.g., NEO 730 and NEO 740) and the ENIP network (e.g., ENIP 720), wherein, switch 700 can forward the frame(s) to the appropriate network (e.g., ENIP or NEO) based on the source MAC address in the frame. In switch mode 6A, ports 1 and 2 can support DLR functionality.

FIG. 8, illustrates switching system 800, an exemplary, non-limiting embodiment referred to herein as switch mode 6B. Switch mode 6B is similar in functionality to that illustrated in FIG. 7, switch mode 6A. However, rather than connecting NEO's and a ENIP, switch mode 6B can support two different NEO backplanes, e.g., a first backplane comprising NEO1 830 and NEO1 840 on ports 1 and 2, with a second NEO backplane, NEO2 820, on port 3. As indicated by the broken line, frames received at ports 1 and/or 2 will not be forwarded to port 3, and vice-versa, frames received at port 3 will not be forwarded to port 1 and/or port 2. As mentioned with regard to switch mode 6A, switch 800, in conjunction with a firmware MUX layer and two Ethernet drivers can effect correct routing of frames from/to the respective NEO backplanes. In switch mode 6B, ports 1 and 2 can support DLR functionality.

FIG. 9, illustrates switching system 900, an exemplary, non-limiting embodiment referred to herein as switch mode 7. Switch mode 7 can support two ENIP network interfaces, having two different IP/MAC addresses, connected to two different subnets/LANs. Switch mode 7 can be configured such that a frame received on a first network on port 1 (e.g., LAN1 930) is not forwarded to a second network connected on port 2 (e.g., LAN2 940), and vice-versa, a frame received on port 2 is not forwarded to port 1. The separation between LAN1 930 and LAN2 940 is indicated by the broken line in FIG. 9. A frame received on either of port 1 or port 2 can be selectively forwarded to either of internal CPU 910 on port 0 or external CPU 920 on port 3, where the selectivity can be based on configuration of a frame routing option(s) for the host CPU port. With reference to FIG. 2, switch mode 2, switch system 900 can utilize the same hardware as that utilized in FIG. 2 but different firmware can be utilized to facilitate switching between a first LAN (e.g., LAN1 930) and a second LAN (e.g., LAN2 940) in comparison with switching between ENIP 230 on port 1 and ENIP 240 on port 1 of FIG. 2. As mentioned with regard to switch mode 5A, switch 900 in conjunction with a firmware MUX layer and two Ethernet drivers can effect correct routing of frames from/to the respective LANs (e.g., at of LAN1 930 or LAN2 940).

During the transmission, associated Ethernet drivers can use at least two different source MAC addresses for transmission of data on the respective LAN network (e.g., LAN1 930 or LAN2 940), wherein, switch 900 can forward the frame(s) to the appropriate network (e.g., LAN1 930 or LAN2 940) based on the source MAC address in the frame. In another exemplary, non-limiting embodiment, switching system 900 can also be utilized to connect two different switches (e.g., multiples of switching system 900) on different virtual LANs (VLANs) with a single IP address or dual IP addresses.

FIG. 10 illustrates switching system 1000, an exemplary, non-limiting embodiment referred to herein as switch mode 8. Switch mode 8 can be configured such that a frame received on a first network on port 1 (e.g., ENIP 1030) is not forwarded to a backplane connected on port 2 (e.g., NEO 1040), and vice-versa, a frame received on port 2 is not forwarded to port 1. The separation between ENIP 1030 and NEO 1040 is indicated by the broken line in FIG. 10. A frame received on either of port 1 or port 2 can be selectively forwarded to either of internal CPU 1010 on port 0 or external CPU 1020 on port 3, where the selectivity can be based on configuration of a frame routing option(s) for the host CPU port. During operation, switch 1000 can automatically add 'received port' information as a last byte in a frame, where the last byte is added after the last data byte in the frame and can regenerate a new frame comprising a new cyclic redundancy check (CRC), where the CRC can be added on-the-fly as part of the transmission operation to the internal CPU 1010 (e.g., from port 0). A firmware MUX layer, can review the 'received port' byte and forward a frame to the appropriate higher level interface e.g., typically two different Ethernet drivers. During the transmission the associated Ethernet drivers can use at least two different source MAC addresses for transmission of data on the respective network (e.g., ENIP 1030 or NEO 1040), wherein, switch 1000 can forward the frame(s) to the appropriate network (e.g., ENIP 1030 or NEO 1040) based on the source MAC address in the frame.

FIG. 11 illustrates switching system 1100, an exemplary, non-limiting embodiment referred to herein as switch mode 9. Switch mode 9 can be configured such that a frame received on a first backplane on port 1 (e.g., NEO1 1130) is not forwarded to a second backplane connected on port 2 (e.g., NEO2 1140), and vice-versa, a frame received on port 2 is not forwarded to port 1. The separation between NEO1 1130 and NEO2 1140 is indicated by the broken line in FIG. 11. A frame received on either of port 1 or port 2 can be selectively forwarded to either of internal CPU 1110 on port 0 or external CPU 1120 on port 3, where the selectivity can be based on configuration of a frame routing option(s) for the host CPU port. During operation, switch 1100 can automatically add 'received port' information as, for example, a last byte in a frame, where the last byte is added after the last data byte in the frame and can regenerate a new frame comprising a new cyclic redundancy check (CRC), where the CRC can be added on-the-fly as part of the transmission operation to internal CPU 1110 (e.g., from port 0). A firmware MUX layer, can review the 'received port' byte and forward a frame to the appropriate higher level interface e.g., typically two different Ethernet drivers. During the transmission the associated Ethernet drivers can use at least two different source MAC addresses for transmission of data on the respective network (e.g., NEO1 1130 or NEO2 1140), wherein, switch 1100 can forward the frame(s) to the appropriate network (e.g., NEO1 1130 or NEO2 1140) based on the source MAC address in the frame.

FIG. 12, illustrates switching system 1200, an exemplary, non-limiting embodiment referred to herein as switch mode 10. Switch mode 10 can support two different networks, e.g., any of a LAN, NEO, ENIP network connected to port 1, and a different LAN, NEO, or ENIP network connected to port 2. As indicated by the broken line, frames received at port 1 will not be forwarded to port 3, and frames received at port 2 will not be forwarded to port 0.

FIG. 13, illustrates an exemplary, non-limiting embodiment of a system comprising ports which can be configured to operate in a plurality of networks. A device 1300 (e.g., a HMI, controller, etc.) has at least two ports, ports 1310 and 1320, facilitating incorporation of device 1300 into a network system. Port 1310 is connected, via link A, to a first side of switch 1360, which is further connected, via link D, to a direct memory access block (DMA BLK) 1330 which has a first address MAC 0. DMA BLK 1330 can be associated with an internal CPU (e.g., internal CPU 110 or 210). Further, link A is also connected, via link E, to DMA BLK 1340 which has a second address MAC 1.

Port 1320 is connected to multiplexer (MUX) 1370, which has a first channel 1371 connected to switch 1360 via link B. Switch 1360 is connected, via link D, to DMA BLK 1330 and also, via link E, to DMA BLK 1340. DMA BLK 1340 can be associated with an external CPU (e.g., external CPU 120 or 220). Switch 1360 can route traffic to DMA BLK 1330 or DMA BLK 1340 based on host CPU frame routing options, as configured in switch 1360.

DMA BLK 1330 and DMA BLK 1340 are connected to bus 1350 (e.g., a processor local bus (PLB)), where bus 1350 can be further connected to any other communication means as necessary, such as a bus (e.g., Peripheral Component Interconnect Express (PCI Express), Processor Local Bus (e.g., PLB master), etc.) to facilitate communication of device 1300 with other components comprising an industrial device. Furthermore, a universal serial bus (USB) 1380 can be connected to bus 1350 to facilitate upload/download of data to device 1300, as further described below.

As shown in FIG. 13, device 1300 can operate whereby data can be communicated between any device(s) respectively attached to port 1310 and 1320 and either of DMA BLK 1330 and/or DMA BLK 1340. Hence, the configuration shown in FIG. 13 is a single network configuration, and thus provides a system depiction of the single LAN modes shown respectively in FIG. 1 (mode 1) and FIG. 2 (mode 2). Where, for example, the connection across ports 1310 and 1320 (e.g., A-B) can be an IP sub-net, where both ports 1310 and 1320 are in the same network.

Further, the system shown in FIG. 13 can be incorporated into a linear network, where port 1310 can be connected to port 2210 of a second device 2200 (e.g., a second HMI in the network) and port 1320 can be connected to port 2310 of a third device 2300 (e.g., a third HMI in the network).

In a further, exemplary, non-limiting embodiment, a configuration file, a parameter, a register, and the like, can be uploaded to device 1300 to define how device 1300 is to operate with regard to network configuration, e.g., in a DLR configuration, an Ethernet configuration, an ENIP configuration, etc. A configuration file 1390 (also comprising a parameter, a register, and the like) can be downloaded to device 1300 from a USB device connected to USB 1380, e.g., USB file 1390. Configuration file 1390 can be applied on device 1300, where the configuration file 1390 indicates that device 1300 is to operate with a configuration where port 1310 is connected to switch 1360 via link A and MUX 1370 is to be switched to channel 1371 to facilitate communications via link B. As presented further herein, the configuration file (e.g., any of 1390, 1490, 1590, 1690, 1790) can contain commands to configure the various switches as required to obtain the required network configuration.

In another, non-limiting, exemplary embodiment, device 1300 can be configured to a particular network configuration based on a configuration component 1399 being presented on a GUI 1395. GUI 1395 facilitates interaction with the configuration component 1399, where the required network configuration of device 1300 can be selected to be DLR, Ethernet, ENIP, linear topology network, ring topology network, star topology, etc., as presented further herein with regard to configuration file 1399, 1499, 1599, 1699, or 1799.

Further, the address(es) for an application on device 1300 can also be configured. Either of MAC 0 and MAC 1 can be configured by means of a respective static IP address, which (e.g., via configuration file 1390 or configuration component 1399) can be assigned (e.g., manually) to IP 0 and/or IP 1. In an alternative embodiment, IP 0 and/or IP 1 can be assigned dynamically (e.g., by means of Dynamic Host Configuration Protocol (DHCP)), where as device 1300 is being integrated into the respective network (e.g., DLR or Ethernet) a configuration server (not shown) can be utilized to configure the respective addresses.

It is to be noted that while systems 1300, 1400, 1500, 1600 and 1700 illustrate different configurations for a device (e.g., a HMI, controller, etc.), each of the systems comprise common components whereby the respective paths in switch 1360, mux switch 1370 settings (e.g., channel 1371 and/or channel 1372), any of ports 1310, 1320, and/or 1325 being utilized, DMA BLKs 1330 and 1340, and the various configurations presented in FIGS. 13-17 are effected by selecting the respective port(s), link(s), DMA BLK(s), channel(s), etc.

FIG. 14, illustrates an exemplary, non-limiting embodiment of a system applicable to the modes illustrated in FIG. 3 (mode 3) and FIG. 4 (mode 4). Device 1400 (e.g., a HMI, controller, etc.) utilizes the three ports, ports 1310, 1320, and 1325, facilitating incorporation of device 1400 into a network system. Port 1310 is connected, via link A, to a first side of switch 1360, which is further connected, via link D, to DMA BLK 1330 which has an address MAC 0. Port 1320 is connected to MUX 1370, of which the first channel 1371 is connected to switch 1360 via link B, and further to DMA BLK 1330, via link D.

Further, the third port 1325 is connected via a third channel 1372 of MUX 1370 and via link C, to DMA BLK 1330. As shown in conjunction with FIGS. 3 and 4, respective NEO and ENIP networks can be supported by the switch in conjunction with an internal CPU. To facilitate configuration of the system shown in FIG. 14, a configuration file 1490 can be uploaded via USB 1380 or a configuration file 1499 can be configured by GUI 1395.

FIG. 15, illustrates an exemplary, non-limiting embodiment of a system applicable to the modes illustrated in FIG. 5 (mode 5A), FIG. 6 (mode 5B), FIG. 7 (mode 6A) and FIG. 8 (mode 6B). Device 1500 (e.g., a HMI, controller, etc.) has three ports, ports 1310, 1320, and 1325, facilitating incorporation of device 1500 into a network system. Port 1310 is connected, via link A, to a first side of switch 1360, which is further connected, via link D, to DMA BLK 1330 which has address MAC 0. Port 1320 is connected to MUX 1370, which has a first channel 1371 connected to switch 1360 via link B. Hence, with this configuration, the common networks illustrated on the right hand side of FIGS. 5-8 can be connected on port 1310 (e.g., port 1 of FIGS. 5-6) and port 1320 (e.g., port 2 of FIGS. 5-6).

Further a second network (as connected to port 3 of FIGS. 5-8) can be connected to a third port 1325 to connect with DMA BLK 1330 via MUX 1370 being switched to channel 1372, link C. Link C connects channel 1372 to DMA BLK 1330, via link D. While all three ports 1310, 1320, and 1325 connect to DMA BLK 1330, sufficient information is carried in each frame received by switch 1360 to facilitate separation of data being communicated on the first network (e.g., via links A and B) from data being communicated on the second network (e.g., via link C), wherein the frame information can comprise at least a source MAC address and a received port (e.g., port 1310, 1320, or 1325).

To facilitate configuration of the system shown in FIG. 15, a configuration file 1590 can be uploaded via USB 1380 or a configuration file 1599 can be configured by GUI 1395.

FIG. 16 illustrates an exemplary, non-limiting embodiment of a system applicable to the modes illustrated in FIG. 9 (mode 7), FIG. 10 (mode 8), and FIG. 11 (mode 9). Device 1600 (e.g., a HMI, controller, etc.) utilizes two ports, ports 1310 and 1320, facilitating incorporation of device 1600 into a system comprising two separate networks. Port 1310 is connected, via link A, to the first side of switch 1360, which is further connected to DMA BLK 1330, via link D, which has address MAC 0. Further, port 1310 can be connected, via link E, to DMA BLK 1340, with address MAC 1, where switch 1360 can direct data between DMA BLK 1330 and DMA BLK 1340.

Furthermore, port 1320 is connected to MUX 1370, which has channel 1371 connected to DMA BLK 1330 via links B and D. Data communicated along link B can be directed to DMA BLK 1330 and/or DMA BLK 1340, via link E. As indicated, DMA BLK 1330 and DMA BLK 1340 have different MAC addresses, hence it is possible to separate frames between DMA BLK 1330 and DMA BLK 1340 on respective links A and B based on source MAC address and received port information comprising a data frame. Routing to link D or link E can be based on host CPU routing options configuration. Hence, with this configuration, the two separate networks illustrated on the right hand side of FIGS. 9-11 can be respectively connected on port 1310 (e.g., port 1 of FIGS. 9-11) and port 1320 (e.g., port 2 of FIGS. 9-11), where a first network could be operating on, for example, 192.168.1.x and the second network could be operating on 192.168.2.x.

To facilitate configuration of the system shown in FIG. 16, a configuration file 1690 can be uploaded via USB 1380 or a configuration file 1699 can be configured by GUI 1395.

FIG. 17, illustrates an exemplary, non-limiting embodiment of a system comprising two networks communicating to respective DMA BLKs via respective ports. Device 1700 (e.g., a HMI, controller, etc.) utilizes two ports, ports 1310 and 1320, facilitating incorporation of device 1700 into a system comprising two separate networks. Port 1310 is connected, via link A, to the first side of switch 1360, which is further connected to DMA BLK 1330, via link D, which has address MAC 0. Port 1320 is connected to multiplexer MUX 1370, which has second channel 1372 further connected to DMA BLK 1340 via link G. DMA BLK 1340 has address MAC 1. Hence, with this configuration, the two separate networks can be operating, where a first network could be operating on, for example, 192.168.1.x and the second network could be operating on 192.168.2.x.

To facilitate configuration of the system shown in FIG. 17, a configuration file 1790 can be uploaded via USB 1380 or a configuration file 1799 can be configured by GUI 1395.

Figure 18:
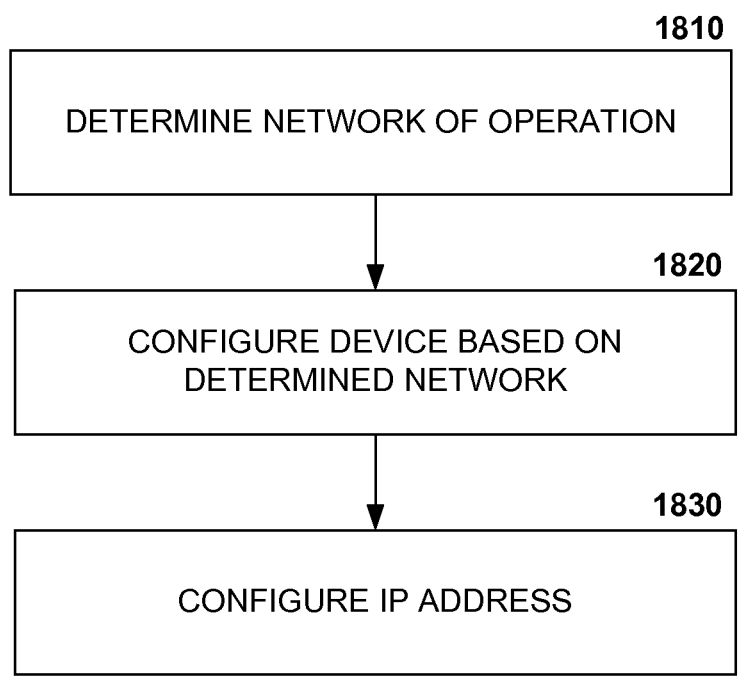
FIG. 18 is a flow diagram illustrating an exemplary, non-limiting embodiment.

Turning to FIG. 18, is a flow diagram illustrating an exemplary, non-limiting embodiment for configuration of a device that can be utilized in a plurality of network configurations. As previously described, a conventional approach for incorporating a device, such as an HMI, into a network requires prior knowledge of the network topology that the device is to be incorporated into. Based on the prior knowledge, a device can be obtained and incorporated. However, a vendor has to offer a range of devices, where each device is configured to a particular network type. Hence a plurality of devices comprise inventory, technical literature and catalogues, etc. It would be beneficial if only one device had to be provided, where the device comprises common network hardware which can be configured (e.g., by a configuration file, manual configuration, etc.) and is thus operable for use in a plurality of network types, protocols, systems, etc.

At 1810, a determination of a network in which the device (e.g., any devices 1300, 1400, 1500, 1600, 1700) is to be utilized is performed. However, unlike a conventional approach where the network determination is to be performed prior to a device being selected and purchased, with the various exemplary, non-limiting embodiments presented herein, the device can be purchased before the network type is known. Such an approach enables a device supplier to only have to stock one multi-configurable device in inventory. Further, a situation may arise where a device is being moved from one operation to another, e.g., from a first industrial plant to a second industrial plant. It is conceivable that the first industrial plant uses an Ethernet network of linear topology, while the second industrial plant uses NEO protocol. With the conventional approach, a HMI operable at the first industrial plant cannot be incorporated into the NEO network of the second industrial plant. Hence, there can exist a level of redundant equipment that is no longer of use. However, with a multi-configurable device, the configuration of the device can be switched from a first configuration to a second configuration (e.g., by appropriate setting of a configuration file, manual configuration, etc.). Hence equipment from the first industrial plant can be utilized at the second industrial plant.

At 1820, based on the determined network (e.g., Ethernet, NEO, DLR, ENIP, subnet, multiple LAN, with associated internal CPU, with associated external CPU, etc.) the multi-configurable device can be configured as required. Any suitable means for configuration can be utilized. As previously mentioned, in an exemplary, non-limiting embodiment, a configuration file can be uploaded to the device to define how the device is to operate with regard to a required network configuration, e.g., in a DLR configuration, an Ethernet configuration, an ENIP network, a NEO network, etc. A configuration file (e.g., any of 1390, 1490, 1590, 1690, 1790) can be downloaded to the device from a USB device connected to a USB port (e.g., USB port 1380). The configuration file can be applied to the device to facilitate operation in a desired mode (e.g., any of modes 1-10, per FIGS. 1-12). In another, non-limiting, exemplary embodiment, the device can be configured based on a configuration component (e.g., any of configuration components 1399, 1499, 1599, 1699, 1799) being presented on a GUI (e.g., GUI 1395). The GUI facilitates interaction with the configuration component, where the required network configuration of the device can be selected. The configuration file can facilitate selection/activation of various MUX switches (e.g., 1371, 1372), linkages (e.g., any of link paths B, C, D, E, G), application of one or more addresses (e.g., requirement for MAC 0 and/or MAC 1), etc.

At 1830, once the network type has been configured for the device, the respective addresses (e.g., MAC ID address, IP address, etc.) can be applied. Either of MAC 0 and MAC 1 can be configured by means of a respective static addressing, where an address can be assigned (e.g., manually) to MAC 0 and/or MAC 1. In an alternative embodiment, MAC 0 and/or MAC 1 can be assigned dynamically (e.g., by means of Dynamic Host Configuration Protocol (DHCP), etc.), where as the device is being integrated into the respective network, a configuration server (not shown) can be utilized to configure the respective network addresses. Configuration of the network (act 1820) and the determination of respective addresses can be performed during startup of the device. Further respective addressing of an application on the device can be applied. Either of MAC 0 and MAC 1 (and alternatively IP 0 associated with MAC 0 and IP 1 associated with MAC 1) can be configured by means of a respective static addressing, where an address can be assigned (e.g., manually) to IP 0 and/or IP 1. In an alternative embodiment, IP 0 and/or IP 1 can be assigned dynamically (e.g., by means of Dynamic Host Configuration Protocol (DHCP), etc.), where as the device is being integrated into the respective network, a configuration server (not shown) can be utilized to configure the respective network addresses. Configuration of the network (act 1820) and the determination of respective addresses can be performed during startup of the device.

In accordance with one or more embodiments and corresponding disclosure, various non-limiting aspects have been described in connection with configuring a device for application in a plurality of disparate network environments. Conventionally a device is manufactured according to the network environment in which the device will be operating. However, such an approach limits the device to only be operable in the network environment for which it was designed, and cannot be incorporated into a disparate network type without replacement of network interfaces, for example.

In an embodiment, a device, such as a HMI, is constructed to comprise of a network switch having a central processor unit (CPU) side channel, a first input channel and a second input channel. An internal CPU can be connected to the CPU side channel of the switch, and further connected to a computer bus facilitating transmission of data from the switch across the HMI computer system. A first external port can be connected to the first input channel of the switch, where the first external port facilitates connection of the HMI to an external network. Further, a multiplexer (MUX) can be incorporated into the HMI, the MUX comprising at least three MUX switches. The first MUX switch can be connected to the second input channel of the switch, the second MUX switch can optionally be connected to an external CPU further connected to the bus, and the third MUX switch can be connected to the internal CPU. A second external port can be connected to the MUX, where the second external port is configured to switch between the first MUX switch and the second MUX switch. A third external port can be connected to the MUX, where the third external port is configured to switch between the second MUX switch and the third MUX switch. A configuration file can be configured to select routing of the second external port to the first MUX switch or the second MUX switch in the multiplexer, and further, can be configured to select routing of the third external port to the second MUX switch or the third MUX switch. The configuration file can be supplied by a universal serial bus device connected to the bus. The configuration file can also be programmed by a graphical user interface connected to the HMI The internal CPU can have a first address while the external CPU can have a second address, where the first address and second address are disparate. A plurality of network types can be supported on the first external port, second external port, and third external port. The network types can include a linear topography network, a ring topography network, a star topography network, Ethernet, ROCKWELL NEO, EtherNet/IP, NEO backplane, a cable level network, a device level network, a backplane level network, where one or more of the same network type can be supported at the same HMI, and further, a combination of disparate network types can be supported on the same HMI.

Depending upon how the HMI is configured, the HMI can process data received from a device being monitored by the HMI, and be further configured to forward the data to a remote device connected to any of the first external port, the second external port, or the third external port.

In another embodiment, a device (e.g., a HMI) can be configured for operating on a plurality of networks, where the configuring can comprise constructing the device to operate in a first network configuration and a second network configuration, determining whether a network for operation of the device is the first network configuration or the second network configuration, and based on the determination, configuring the device to operate in the first network or the second network. The first network and the second network can be any of a linear topography network, a ring topography network, a star topography network, Ethernet, ROCKWELL NEO, a cable level network, a device level network, a backplane level network, where one or more of the same or different network types can be supported by the device. When operating the device in a HMI, the HMI can be configured for processing data being received from a device monitored by the HMI, and further configured for forwarding the data to a remote device connected to the first network or the second network.

In a further embodiment, a computer-readable storage medium comprising computer executable instructions can be utilized that, in response to execution, cause a computing system to perform operations comprising: selecting, in a MUX, a first MUX switch or a second MUX switch, wherein the first MUX switch can be connected to an internal central processor unit (CPU) and the second MUX switch can be connected to an external central processor unit (CPU), selection of the first MUX switch facilitating operation in a single network and selection of the second MUX switch facilitating operation in a network comprising a first local area network and a second local area network. Further, in another embodiment, a first data frame can be received at an external port associated with the first MUX switch and the second MUX switch, where identification of whether the first data frame was received from the first local area network or the second local area network can be conducted. A second data frame can be generated from the first data frame with cyclic redundancy check code being added to the second data frame to facilitate identifying whether the first data frame was received from the first local area network or the second local area network. In another embodiment, the computer system can be incorporated into an HMI, with operation of the HMI being configurable, based on the selecting of the first MUX switch or the second MUX switch, for operating in the single network or in a network comprising the first local area network and the second local area network.

Embodiments, systems, and components described herein, as well as industrial control systems and industrial automation environments in which various aspects set forth in the subject specification can be carried out, can include computer or network components such as servers, clients, PLCs, automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, I/O device, sensor, actuator, and HMI that communicate via the network, which includes control, automation, and/or public networks. The PLC or automation controller can also communicate to and control various other devices such as I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and EtherNet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Exemplary Networked and Distributed Environments

One of ordinary skill in the art can appreciate that the various embodiments presented herein for industrial automation environment applications can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in facilitating incorporation of a device, having a plurality of network configurations, into any supported network as described for various embodiments of the subject disclosure.

Figure 19:
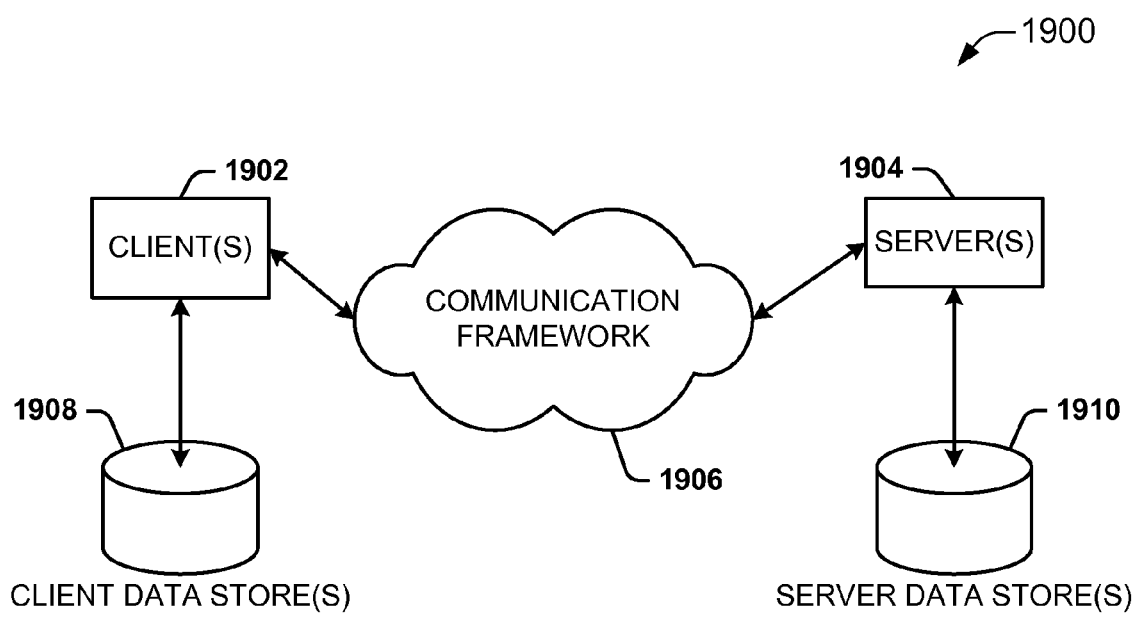
FIG. 19 is an example networking environment.

FIG. 19 is a schematic block diagram of a sample-computing environment 1900 with which the disclosed subject matter can interact. The system 1900 includes one or more client(s) 1910. The client(s) 1910 can be hardware and/or software (e.g., threads, processes, computing devices). The system 1900 also includes one or more server(s) 1930. The server(s) 1930 can also be hardware and/or software (e.g., threads, processes, computing devices). The servers 1930 can house threads to perform transformations by employing one or more embodiments as described herein, for example. One possible communication between a client 1910 and a server 1930 can be in the form of a data packet adapted to be transmitted between two or more computer processes. The system 1900 includes a communication framework 1950 that can be employed to facilitate communications between the client(s) 1910 and the server(s) 1930. The client(s) 1910 are operably connected to one or more client data store(s) 1960 that can be employed to store information local to the client(s) 1910. Similarly, the server(s) 1930 are operably connected to one or more server data store(s) 1940 that can be employed to store information local to the servers 1930.

Exemplary Computing Device

As mentioned, advantageously, the techniques described herein can be applied to any device where it is desirable to deploy an application, according to a plurality of configurations, to a plurality of devices in an industrial automation environment. It can be understood, therefore, that handheld, portable and other computing devices and computing objects of all kinds are contemplated for use in connection with the various embodiments, i.e., anywhere that where users can access, utilize, or deploy industrial applications. Accordingly, the below general purpose remote computer described below in FIG. 20 is but one example of a computing device.

Embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 20:
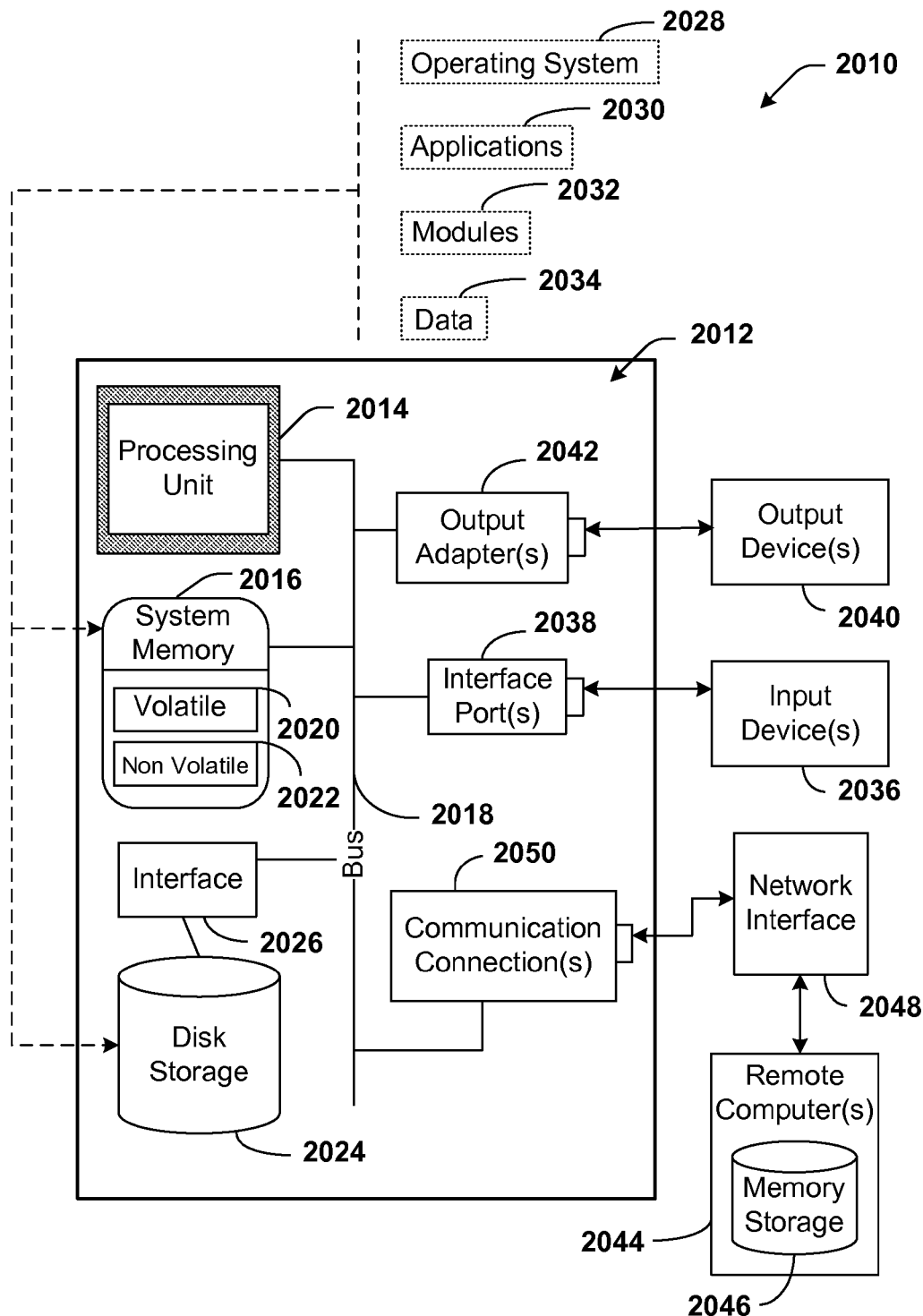
FIG. 20 is an example computing environment.

With reference to FIG. 20, an example environment 2010 for implementing various aspects of the aforementioned subject matter includes a computer 2012. The computer 2012 includes a processing unit 2014, a system memory 2016, and a system bus 2018. The system bus 2018 couples system components including, but not limited to, the system memory 2016 to the processing unit 2014. The processing unit 2014 can be any of various available processors. Dual microprocessors and other multiprocessor architectures also can be employed as the processing unit 2014.

The system bus 2018 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 2016 includes volatile memory 2020 and nonvolatile memory 2022. The basic input/output system (BIOS), containing the basic routines to transfer information between elements within the computer 2012, such as during start-up, is stored in nonvolatile memory 2022. By way of illustration, and not limitation, nonvolatile memory 2022 can include read only memory (ROM), programmable ROM (PROM), electrically programmable ROM (EPROM), electrically erasable PROM (EEPROM), or flash memory. Volatile memory 2020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2012 also includes removable/non-removable, volatile/nonvolatile computer storage media. FIG. 20 illustrates, for example a disk storage 2024. Disk storage 2024 includes, but is not limited to, devices like a magnetic disk drive, floppy disk drive, tape drive, Jaz drive, Zip drive, LS-100 drive, flash memory card, or memory stick. In addition, disk storage 2024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2024 to the system bus 2018, a removable or non-removable interface is typically used such as interface 2026.

It is to be appreciated that FIG. 20 describes software that acts as an intermediary between users and the basic computer resources described in suitable operating environment 2010. Such software includes an operating system 2028. Operating system 2028, which can be stored on disk storage 2024, acts to control and allocate resources of the computer system 2012. System applications 2030 take advantage of the management of resources by operating system 2028 through program modules 2032 and program data 2034 stored either in system memory 2016 or on disk storage 2024. It is to be appreciated that one or more embodiments of the subject disclosure can be implemented with various operating systems or combinations of operating systems.

A user enters commands or information into the computer 2012 through input device(s) 2036. Input devices 2036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2014 through the system bus 2018 via interface port(s) 2038. Interface port(s) 2038 include, for example, a serial port, a parallel port, a game port, and a universal serial bus (USB). Output device(s) 2040 use some of the same type of ports as input device(s) 2036. Thus, for example, a USB port may be used to provide input to computer 2012, and to output information from computer 2012 to an output device 2040. Output adapter 2042 is provided to illustrate that there are some output devices 2040 like monitors, speakers, and printers, among other output devices 2040, which require special adapters. The output adapters 2042 include, by way of illustration and not limitation, video and sound cards that provide a means of connection between the output device 2040 and the system bus 2018. It should be noted that other devices and/or systems of devices provide both input and output capabilities such as remote computer(s) 2044.

Computer 2012 can operate in a networked environment using logical connections to one or more remote computers, such as remote computer(s) 2044. The remote computer(s) 2044 can be a personal computer, a server, a router, a network PC, a workstation, a microprocessor based appliance, a peer device or other common network node and the like, and typically includes many or all of the elements described relative to computer 2012. For purposes of brevity, only a memory storage device 2046 is illustrated with remote computer(s) 2044. Remote computer(s) 2044 is logically connected to computer 2012 through a network interface 2048 and then physically connected via communication connection 2050. Network interface 2048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2050 refers to the hardware/software employed to connect the network interface 2048 to the bus 2018. While communication connection 2050 is shown for illustrative clarity inside computer 2012, it can also be external to computer 2012. The hardware/software necessary for connection to the network interface 2048 includes, for exemplary purposes only, internal and external technologies such as, modems including regular telephone grade modems, cable modems and DSL modems, ISDN adapters, and Ethernet cards.

As mentioned above, while exemplary embodiments have been described in connection with various computing devices and network architectures, the underlying concepts may be applied to any network system and any computing device or system in which it is desirable to implement a game for real-world application.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

General Considerations

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

Further, it is possible to infer, e.g., a process of reasoning about or inferring states of the system, environment, and/or user from a set of observations as captured via events and/or data. Inference can be employed to identify a specific context or action, or can generate a probability distribution over states, for example. The inference can be probabilistic, that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

As mentioned, the various techniques described herein may be implemented in connection with hardware or software or, where appropriate, with a combination of both. As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removably affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include I/O components as well as associated processor, application, or Application Programming Interface (API) components. While the foregoing examples are directed to aspects of a component, the exemplified aspects or features also apply to a system, platform, interface, layer, controller, terminal, and the like.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary, non-limiting embodiments presented herein, methodologies that may be implemented in accordance with the exemplary, non-limiting embodiments can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described herein.

Various embodiments described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A network switching system, comprising:
    a switch comprising a central processor unit (CPU) side channel, a first input channel and a second input channel;
    an internal CPU connected to the CPU side channel of the switch and a computer bus;
    a first external port connected to the first input channel of the switch;
    a multiplexer (MUX) comprising at least a first MUX switch connected to the second input channel of the switch;
    a second external port connected to the multiplexer;
    a third external port connected to the multiplexer; and
    a configuration component configured to receive a configuration parameter input that transitions the network switching system between a first mode that configures the first external port, the second external port, and the third external port for operation on a single network, and a second mode that configures the first external port and the second external port for operation on a first network and configures the third external port for operation on a second network.

2. The network switching system of claim 1, wherein the internal CPU has a first address.

3. The network switching system of claim 1, further comprising an external CPU, wherein the external CPU is connected to the computer bus and the external CPU has a second address.

4. The network switching system of claim 3, wherein the multiplexer further comprises a second MUX switch connected to the external CPU.

5. The network switching system of claim 1, wherein the first MUX switch is connected to the internal CPU.

6. The network switching system of claim 4, wherein the configuration parameter is further configured to select routing of the third external port to the second MUX switch in the multiplexer.

7. The network switching system of claim 1, wherein the first external port and the second external port are configured to operate with at least one of an Ethernet network protocol, EtherNet/IP network protocol, a NEO backplane protocol, or a local area network.

8. The network switching system of claim 1, wherein the configuration component is configured to receive the configuration parameter is via a universal serial bus port connected to the computer bus.

9. The network switching system of claim 1, wherein the configuration component is configured to receive the configuration parameter is via a graphical user interface.

10. The network switching system of claim 1, wherein the system is operable in any of a linear topology network, a ring topology network, or a star topology network.

11. The network switching system of claim 1, wherein the system is incorporated into a human machine interface (HMI) device.

12. The network switching system of claim 11, wherein the HMI device is configured to process data received from a device being monitored by the HMI device, and is further configured to forward the data to a remote device connected to the first external port or the second external port.

13. A non-transitory computer-readable storage medium comprising computer executable instructions that, in response to execution, cause a network switching device to perform operations comprising:
    receiving configuration input that indicates a selected mode, of a single network mode or a dual network mode, for the network switching device comprising a first external port, a second external port, and a third external port;
    in response to determining that the selected mode is the single network mode, configuring a switch of the network switching device to place the first external port, the second external port, and the third external port on a same network; and
    in response to determining that the selected mode is the dual network mode, configuring the switch to place the first external port and the second external port on a first network, and to place the third external port on a second network.

14. The non-transitory computer-readable storage medium of claim 13, the operations further comprising:
    receiving a data frame at one of the first external port, the second external port, or the third external port; and
    in response to determining that the selected mode is the dual network mode:
        identifying whether the data frame was received from the first network or the second network, and
        adding receive port information to the data frame, wherein the receive port information identifies whether the data frame was received from the first network or the second network.

15. The non-transitory computer-readable storage medium of claim 13, wherein the network switching device is incorporated into a human machine interface, the human machine interface being configurable, based on the selected mode, for operating in a single network or in a plurality of networks.

16. The network switching system of claim 1, wherein the switch is configured to, in response to a determination that the network switching system is operating in the second mode, add port information to an incoming data frame received via the first external port, the second external port, or the third external port, the port information indicating whether the data frame was received via the first network or the second network.

* * * * *